US011421734B2

(12) United States Patent
McLaughlin et al.

(10) Patent No.: US 11,421,734 B2
(45) Date of Patent: Aug. 23, 2022

(54) ACTIVE RADIAL MAGNETIC BEARING ASSEMBLY WITH INTERNAL SENSORS

(71) Applicant: Synchrony, Inc., Salem, VA (US)

(72) Inventors: Ryan McLaughlin, Corning, NY (US); Christopher K. Sortore, Roanoke, VA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 289 days.

(21) Appl. No.: 16/484,493

(22) PCT Filed: Jan. 15, 2018

(86) PCT No.: PCT/US2018/013707
§ 371 (c)(1),
(2) Date: Aug. 8, 2019

(87) PCT Pub. No.: WO2018/151883
PCT Pub. Date: Aug. 23, 2018

(65) Prior Publication Data
US 2020/0032845 A1 Jan. 30, 2020

Related U.S. Application Data

(60) Provisional application No. 62/459,125, filed on Feb. 15, 2017.

(51) Int. Cl.
*F16C 32/04* (2006.01)
*H02K 11/215* (2016.01)
*H02K 7/09* (2006.01)

(52) U.S. Cl.
CPC ...... *F16C 32/0482* (2013.01); *F16C 32/0442* (2013.01); *F16C 32/0444* (2013.01);
(Continued)

(58) Field of Classification Search
CPC .............. F16C 32/0482; F16C 32/0442; F16C 32/0444; F16C 32/0493; F16C 32/048;
(Continued)

(56) References Cited

U.S. PATENT DOCUMENTS 4,956,945 A * 9/1990 Ooshima .................. B23Q 1/70
451/1
5,347,190 A * 9/1994 Lewis ................. F16C 32/0455
310/90.5
(Continued)

FOREIGN PATENT DOCUMENTS

DE 3523344 A1 1/1987
DE 10308442 B3 7/2004
(Continued)

OTHER PUBLICATIONS

Horsemann, W., "Prozessregelung beim Innenrundschleifen mit aktiv magnetgelagerten Spindeln", VDI Z, Springer VDI Verlag, DE, vol. 132, No. 12, Dec. 1, 1990, pp. 77-79, XP000176613, ISSN: 0042-1766.
(Continued)

*Primary Examiner* — Ahmed Elnakib
(74) *Attorney, Agent, or Firm* — Fletcher Yoder, P.C.

(57) ABSTRACT

An active radial magnetic bearing assembly for a rotating machine. The active radial magnetic bearing assembly may include a housing comprising a center axis, a stator coupled to the housing, a rotor, a first target, a second target, and a plurality of sensors. At least a portion of the rotor may be configured to rotate about the center axis within the stator. The first target may be a portion of a rotor outer surface and the second target may be coupled to or formed by the rotor. The plurality of sensors may be coupled to the stator and adjacent a stator inner surface. Each sensor of the plurality of sensors may detect at least one of a radial position and an
(Continued)

axial position of the rotor via the first target or the second target.

20 Claims, 5 Drawing Sheets

(52) U.S. Cl.
CPC ........... *F16C 32/0493* (2013.01); *H02K 7/09* (2013.01); *H02K 11/215* (2016.01)

(58) Field of Classification Search
CPC  F16C 32/0474; F16C 32/044; F16C 32/0485; F16C 32/0489; F16C 32/0696; H02K 11/215; H02K 7/09
USPC .......................................................... 310/68 B
See application file for complete search history.

(56) References Cited

U.S. PATENT DOCUMENTS

| | | | | |
|---|---|---|---|---|
| 5,739,607 | A * | 4/1998 | Wood, III | H02K 7/083 310/90 |
| 5,772,564 | A * | 6/1998 | Taniguchi | B23Q 1/70 310/90.5 |
| 6,215,218 | B1 * | 4/2001 | Ueyama | F16C 32/0442 310/90.5 |
| 2006/0055259 | A1 * | 3/2006 | Hanlon | G05B 9/03 310/90.5 |
| 2008/0073993 | A1 * | 3/2008 | Sortore | F16C 32/047 310/90.5 |
| 2008/0185928 | A1 * | 8/2008 | Buhler | F04D 29/058 310/90.5 |
| 2009/0265038 | A1 * | 10/2009 | Ramsey | F16C 32/0442 700/279 |
| 2013/0328455 | A1 * | 12/2013 | Wu | F16C 32/0476 310/68 B |

FOREIGN PATENT DOCUMENTS

| | | |
|---|---|---|
| DE | 102006018267 A1 | 11/2007 |
| EP | 0875685 A2 | 11/1998 |
| JP | H0979259 A | 3/1997 |

OTHER PUBLICATIONS

PCT International Search Report and Written Opinion dated Apr. 19, 2018 corresponding to PCT Application PCT/ US2018/013707 filed Jan. 15, 2018.

* cited by examiner

ACTIVE RADIAL MAGNETIC BEARING ASSEMBLY WITH INTERNAL SENSORS

This application claims the benefit under 35 U.S.C. § 119(e) of U.S. Provisional Application No. 62/459,125 filed on Feb. 15, 2017 and entitled ACTIVE RADIAL MAGNETIC BEARING ASSEMBLY WITH INTERNAL SENSORS, which is incorporated herein by reference in its entirety and to which this application claims the benefit of priority.

BACKGROUND

1. Technical Field

Aspects of the present invention relate to an active radial magnetic bearing assembly having internal sensors and, more particularly, to an active radial magnetic bearing assembly having a housing that includes a center axis, a stator coupled to the housing, a rotor, a first target, a second target, and a plurality of sensors wherein the first target may be a portion of a rotor outer surface and the second target may be coupled to or formed by the rotor and wherein each sensor of the plurality of sensors may detect at least one of a radial position and an axial position of the rotor via the first target or the second target.

2. Description of Related Art

Active radial magnetic bearing systems may be used in different rotating machines such as electric motors, compressors, turbines, and generators. Active radial magnetic bearing systems help maintain the radial position of a rotating shaft by means of magnetic fields acting on a rotor affixed to the rotating shaft of the rotating machine. The electromagnets may be attached to a stator and disposed equiangularly about the rotor. Generally, active radial magnetic bearing systems use a control system to regulate the magnetic fields acting on the rotor. The control system typically includes a controller and a sensor array including a plurality of sensors that provide information, such as position and speed, to the controller, where the information is used to adjust the magnetic fields generated by the electromagnets.

Typically, the sensor array consists of several sensor target disks coupled to the rotor and a plurality of sensors installed in a sensor array housing which is attached to the auxiliary bearing assembly. As arranged, such sensor arrays may have certain drawbacks including an increase in the size, cost, and assembly time of the active radial magnetic bearing. Further, the sensor target disks may negatively impact the radial dynamics of the rotor.

What is needed, therefore, is an improved active radial magnetic bearing system capable of maintaining the radial position of the rotating shaft of a rotating machine wherein the above drawbacks have been relieved.

SUMMARY

Embodiments of the disclosure may provide a rotating machine. The rotating machine may include an active radial magnetic bearing assembly. The active radial magnetic bearing assembly may include a housing, a stator, a rotor, a first target, a second target, and a plurality of sensors. The housing may include a center axis extending longitudinally therethrough and a housing inner surface. The stator may be coupled to the housing inner surface and include a stator inner surface extending axially between a first stator end wall and a second stator end wall. The rotor may include a rotor outer surface, and at least a portion of the rotor may be configured to rotate about the center axis within the stator, such that an annular gap is defined between the rotor outer surface and the stator inner surface. A portion of the rotor outer surface may be the first target. The second target may be coupled to or formed from the rotor, and be axially spaced from the first target along the rotor. The plurality of sensors may be coupled to the stator and adjacent the stator inner surface. A first sensor and a second sensor of the plurality of sensors may be positioned to detect a radial position of the rotor via the first target. A third sensor of the plurality of sensors may be positioned to detect an axial position of the rotor via the second target.

Embodiments of the disclosure may also provide an active radial magnetic bearing assembly. The active radial magnetic bearing assembly may include a housing, a stator, a rotor, a first target, a second target, and a plurality of sensors. The housing may include a center axis extending longitudinally therethrough and a housing inner surface. The stator may be coupled to the housing inner surface and include a stator inner surface extending axially between a first stator end wall and a second stator end wall. The rotor may include a rotor outer surface, and at least a portion of the rotor may be configured to rotate about the center axis within the stator, such that an annular gap is defined between the rotor outer surface and the stator inner surface. A portion of the rotor outer surface may be the first target. The second target may be coupled to or formed from the rotor, and be axially spaced from the first target along the rotor. The plurality of sensors may be coupled to the stator and adjacent the stator inner surface. A first sensor and a second sensor of the plurality of sensors may be positioned to detect a radial position of the rotor via the first target. A third sensor of the plurality of sensors may be positioned to detect an axial position of the rotor via the second target.

Embodiments of the disclosure may further provide a system for determining an axial position, a radial position, and at least one of a phase angle and a rotational speed of a rotary shaft. The system may include a rotary shaft, a plurality of active radial magnetic bearing assemblies, and a control system. Each active radial magnetic bearing assembly may include a housing, a stator, a rotor, a first target, a second target, and a plurality of sensors. The housing may include a center axis extending longitudinally therethrough and a housing inner surface. The stator may be coupled to the housing inner surface and include a stator inner surface extending axially between a first stator end wall and a second stator end wall. The rotor may be coupled to the rotary shaft and include a rotor outer surface, and at least a portion of the rotor may be configured to rotate about the center axis within the stator, such that an annular gap is defined between the rotor outer surface and the stator inner surface. A portion of the rotor outer surface may be the first target. The second target may be coupled to or formed from the rotor, and be axially spaced from the first target along the rotor. The plurality of sensors may be coupled to the stator and adjacent the stator inner surface. A first sensor and a second sensor of the plurality of sensors may be positioned to detect the radial position of the rotary shaft via the first target and transmit a radial position feedback signal. A third sensor of the plurality of sensors may be positioned to detect the axial position of the rotary shaft via the second target and transmit an axial position feedback signal. One active radial magnetic bearing assembly of the plurality of active radial magnetic bearing assemblies may further include a fourth sensor positioned to detect the at least one of the phase angle and the rotational speed of the rotary shaft via a third target and transmit at least one of a phase angle feedback signal and a rotational speed feedback signal. The control system may be configured to receive the radial position feedback signals, the axial position feedback signal, and the at least one of the phase angle feedback signal and the rotational speed feedback signal and determine the radial position, the axial position, and the at least one of the phase angle and the rotational speed of the rotary shaft.

BRIEF DESCRIPTION OF THE DRAWINGS

Aspects of the present disclosure are best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
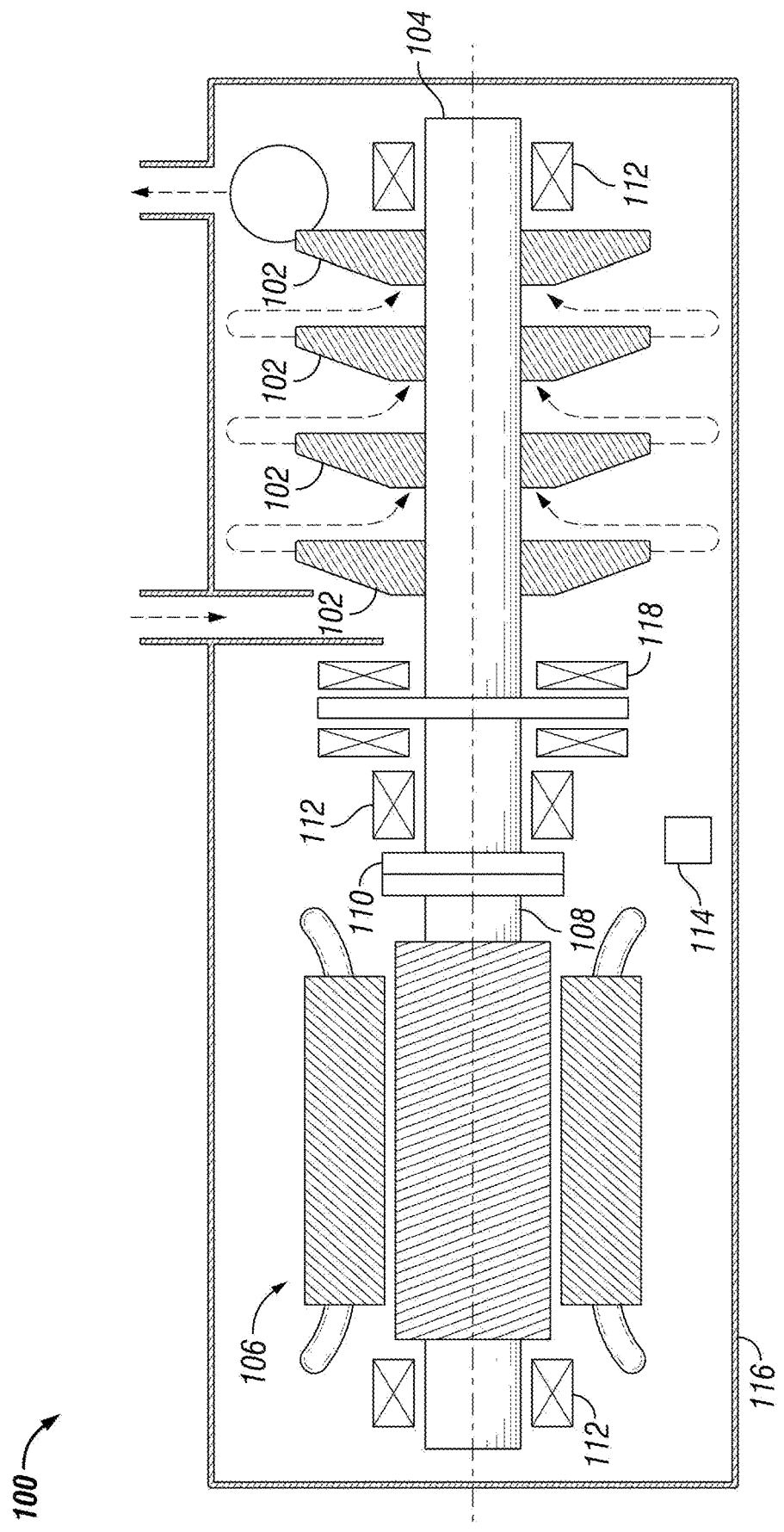
FIG. 1 illustrates a schematic of an exemplary rotating machine, according to one or more embodiments disclosed.

It is to be understood that the following disclosure describes several exemplary embodiments for implementing different features, structures, or functions of the invention. Exemplary embodiments of components, arrangements, and configurations are described below to simplify aspects of the present disclosure; however, these exemplary embodiments are provided merely as examples and are not intended to limit the scope of the invention. Additionally, aspects of the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

FIG. 1 illustrates a schematic of an exemplary rotating machine 100, according to one or more embodiments disclosed. As shown in FIG. 1, the rotating machine 100 may be a compressor including one or more bladed impellers 102 mounted on a rotating shaft 104. In other embodiments, the rotating machine 100 may be an electric motor, turbine, generator, or any other machine utilizing a rotating shaft 104.

In some embodiments, a driver 106 may be configured to provide rotational energy to the rotating machine 100 through a drive shaft 108. The drive shaft 108 may be coupled to the rotating shaft 104 directly or through a gear box 110, as illustrated in FIG. 1. Accordingly, the drive shaft 108 and rotating shaft 104 may rotate at the same speed or different speeds via the gearbox 110. The driver 106 may be an electric motor (as shown in FIG. 1), an internal combustion engine, a turbine, or any other device capable of providing rotational energy to the rotating shaft 104. In other embodiments, an external component may provide a source of rotational energy to the rotating machine 100 via the rotating shaft 104.

The rotating shaft 104, the drive shaft 108, or both may be supported by active radial magnetic bearing assemblies 112 in electronic communication with a controller 114. The active radial magnetic bearing assemblies 112 may be coupled to a casing 116 of the rotating machine 100. As illustrated in FIG. 1, the active radial magnetic bearing assemblies 112 may be disposed on opposing ends of the impellers 102 in a center-hung configuration. In other embodiments, the active radial magnetic bearing assemblies 112 may be arranged in an overhung configuration.

The controller 114 receives radial position information and axial position information from sensors on the active radial magnetic bearing assemblies 112. The controller 114 may also receive phase angle or rotational speed information from the sensors. This information may then be used by the controller 114 to adjust the electrical power supplied to electromagnets within the active radial magnetic bearing assemblies 112, thereby adjusting the magnetic forces generated by the active radial magnetic bearing 112. In at least one embodiment, the controller 114 may be configured to levitate and at least partially support the rotating shaft 104.

In another embodiment, the controller 114 may be configured to compensate for an unbalanced or dynamic load on the rotating shaft 104.

One or more axial thrust bearing assemblies 118 may be used to at least partially support or counteract thrust loads on the rotating shaft 104. Illustrative thrust bearing assemblies 118 may include, but are not limited to, magnetic bearings, tapered roller bearings, and fluid film bearings. In one embodiment, the thrust bearing assemblies 118 may be active magnetic thrust bearing assemblies and the controller 114 may adjust the magnetic forces generated by the active magnetic thrust bearing assemblies 118.

Figure 2:
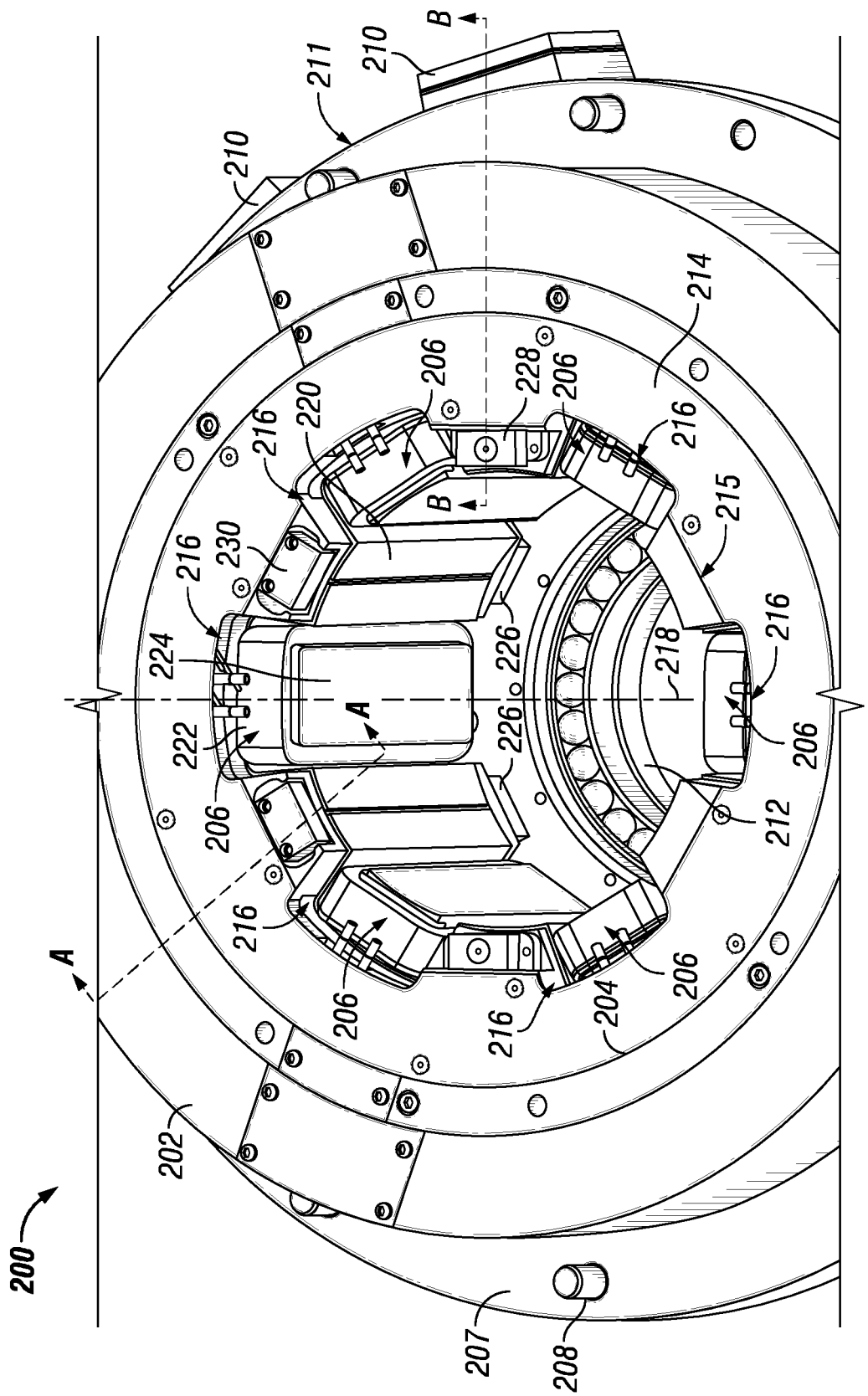
FIG. 2 illustrates a partial perspective view of an exemplary active radial magnetic bearing assembly without a rotor, according to one or more embodiments disclosed.

Referring now to FIG. 2 with continued reference to FIG. 1, FIG. 2 illustrates a partial perspective view of an exemplary active radial magnetic bearing assembly 200, which may be used in place of one or more of the active radial magnetic bearing assemblies 112 of FIG. 1, according to one or more embodiments. The active radial magnetic bearing assembly 200 may include a housing 202, a stator 204, a rotor, and a plurality of electromagnets 206 (six shown). The rotor is omitted for the sake of clarity and will be discussed relative to FIG. 3 below.

The housing 202 may include a flange 207 that defines a plurality of circumferentially disposed holes configured to receive a plurality of fasteners 208 to couple the active radial magnetic bearing assembly 200 to the casing 116 of the rotating machine 100. The housing 202 may also serve as a mounting location for multiple electrical junction boxes 210 that may be attached to the outer surface 211 of the housing 202.

An auxiliary bearing assembly 212 may be coupled to or adjacent the housing 202 to provide a redundant radial bearing in the case of a failure in the active radial magnetic bearing assembly 200 or the controller 114. In at least one embodiment, the auxiliary bearing assembly 212 may include ball bearings. In other embodiments, the auxiliary bearing assembly 212 may include cylindrical roller bearings, a journal bearing, or any other bearing suitable for supporting a radial load.

As illustrated in FIG. 2, the stator 204 may be coupled to the housing 202 and include axially opposing end walls (one shown 214) and an inner annular surface 215 extending therebetween. In one or more embodiments, the inner annular surface 215 of the stator 204 may define a plurality of recesses 216 (six shown) in which the electromagnets 206 can be mounted. The recesses 216 may be circumferentially spaced from one another about a central, longitudinal axis 218. The stator 204 may further include covers 220 (only one indicated) coupled to the inner annular surface 215 between the recesses 216. The covers 220 may be configured to shield electrical cabling or any other communication equipment running along the inner annular surface 215 of the stator 204.

The plurality of electromagnets 206 may generate magnetic fields that levitate the rotating shaft 104, compensate for unbalanced loads on the rotating shaft 104, or provide at least partial support for the rotating shaft 104. The controller 114 may adjust the power supplied to the electromagnets 206, thereby adjusting the magnetic forces. Each of the electromagnets 206 may include a wire coil 222 (only one indicated) wrapped around a metallic core 224 (only one indicated).

As shown in FIG. 2, six electromagnets 206 may be disposed circumferentially about the central, longitudinal axis 218. In other embodiments, the active radial magnetic bearing assembly 200 may include a plurality of electromagnets 206 such as four, eight, ten, or more electromagnets 206 disposed circumferentially about the central, longitudinal axis 218.

A plurality of sensors 226, 228, 230 may be coupled to the stator 204, according to one or more embodiments. The plurality of sensors 226, 228, 230 may be coupled to or positioned adjacent the inner annular surface 215 and disposed between adjacent electromagnets 206. Each sensor 226, 228, 230 may communicate with the controller 114 and is positioned to determine at least one of a radial position, an axial position, a phase angle, and a rotational speed. In some embodiments, the plurality of sensors 226, 228, 230 may include a plurality of radial position sensors 226, one or more axial position sensors 228 (only one indicated), and one or more phase angle or rotational speed sensors 230 (only one indicated). In other embodiments, the one or more phase angle or rotational speed sensors 230 may be omitted therefrom.

In the illustrative embodiment of FIG. 2, the active radial magnetic bearing assembly 200 includes two axial position sensors 228 and two phase angle or rotational speed sensors 230 adjacent the inner annular surface 215 and the exposed end wall 214 of the stator 204, and two radial position sensors 226 adjacent the inner annular surface 215 and the end wall of the stator 204 proximate the auxiliary bearing assembly 212.

In at least one embodiment, each of the sensors 226, 228, 230 may be coupled to or positioned adjacent the inner annular surface 215 and the exposed end wall 214 of the stator 204. In another embodiment, the axial position sensors 228 may be coupled to or adjacent the inner annular surface 215 and the exposed end wall 214 of the stator 204, and the radial position sensors 226 and phase angle or rotational speed sensors 230 may be coupled to the stator 204, and adjacent the inner annular surface 215 and either the end wall of the stator 204 proximate the auxiliary bearing assembly 212 or the exposed end wall 214 of the stator 204.

Figure 3:
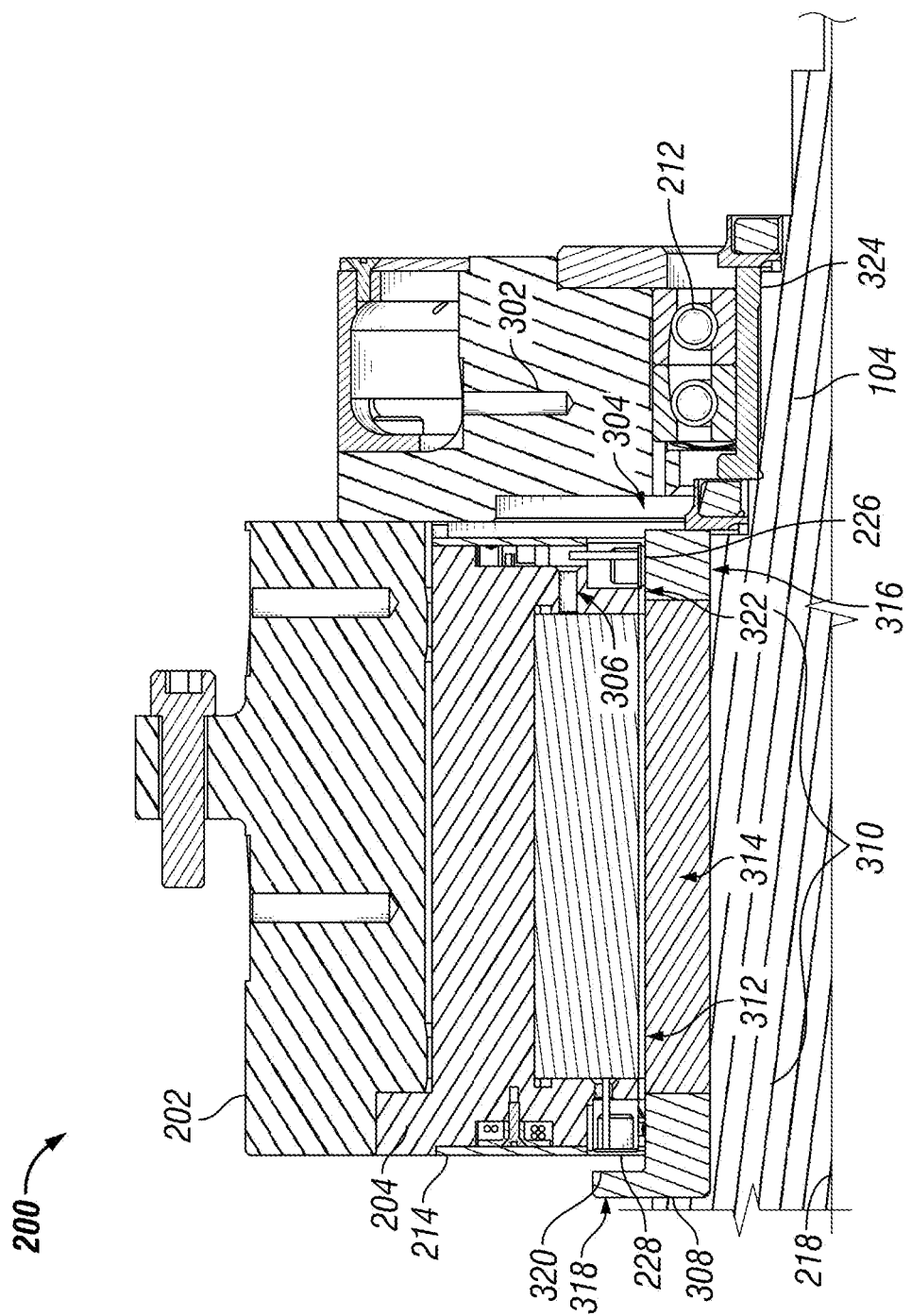
FIG. 3 illustrates a partial cross-sectional view of the active radial magnetic bearing assembly of FIG. 2 along line A-A with a rotor, according to one or more embodiments disclosed.

FIG. 3 illustrates a partial cross-sectional view of the active radial magnetic bearing assembly 200 of FIG. 2 along line A-A, according to one or more embodiments disclosed. As shown in the exemplary embodiment, the housing 202 and auxiliary bearing 212 may define a plurality of internal channels (one shown 302) through which electrical cabling (not shown) or cooling gas can pass. In some embodiments, an annular cavity 304 may be created between the stator 204 and the auxiliary bearing assembly 212. The annular cavity 304 may allow cooling gas to pass from the stator 204 to the auxiliary bearing assembly 212.

As illustrated in FIG. 3, the stator 204 may define a plurality of channels 306 that allow electrical cabling to pass from the sensors 226, 228, 230 or electromagnets 206 to the electrical junction box or boxes 210 mounted on the housing 202 or the auxiliary bearing assembly 212. In other embodiments, the electrical cabling may be exposed along the inner annular surface 215 or routed through the annular cavity 304 created between the stator 204 and the auxiliary bearing assembly 212. In at least one embodiment, electrical cabling or any other communication equipment may be run along the inner annular surface 215 and covered to prevent damage from debris The active radial magnetic bearing assembly 200 may further include a rotor 308 coupled to the rotating shaft 104. The rotor 308 may be coupled to the rotating shaft 104 through an interference fit, welding, or similar means of attachment. In other embodiments, the rotor 308 may be formed from the rotating shaft 104. A portion 310 of the rotor 308 may be configured to fit inside the stator 204 such that an annular gap 312 is created between the rotor 308 and the stator 204.

A section 314 of the rotor 308 may include a magnetic material that allows the rotor 308 and rotating shaft 104 to be levitated by the electromagnets 206 coupled to the stator 204. In other embodiments, the entire rotor 308 may be magnetic, an annular sleeve 316 may be coupled to the rotor 308 through an interference fit, welding, or similar means of attachment, or a magnetic material may be inlaid into the rotor 308.

As shown in the exemplary embodiment, the rotor 308 may include a radial protrusion 318 that is axially spaced outside of the stator 204. The radial protrusion 318 may include a surface 320 that is perpendicular or nearly perpendicular to the central, longitudinal axis 218 and facing the exposed end wall 214. The axial position sensor or sensors 228 may be facing the protrusion surface 320 and use the protrusion 318 as a target to detect the axial position of the rotor 308 or rotating shaft 104. The radial position sensors 226 may face the outer surface 322 of the rotor 308 or annular sleeve 316 and use the rotor 308 or annular sleeve 316 as a target to detect the radial position of the rotor 308 or rotating shaft 104.

Each of the radial position sensors 226 and the axial position sensors 228 may be eddy current sensors. Eddy current sensors generate alternating magnetic fields to induce currents in the target. The currents create magnetic fields opposite to the magnetic fields generated by the eddy current sensors. The eddy current sensors detect the opposing magnetic fields and determine the distance between the sensor and the target.

In the exemplary embodiment, the radial position sensors 226 use the annular sleeve 316 as the target and the axial position sensors 228 use the protrusion 318 as the target. Another embodiment of the active radial magnetic bearing assembly 200 may use the rotor 308 itself or another component coupled to the rotor 308 as a target for the radial position sensors 226.

In other embodiments, the radial position sensors 226 and axial position sensors 228 may be or include visual sensors, infrared sensors, ultrasonic sensors, or any other type of sensor capable of being paired with the controller 114. In some embodiments, the active radial magnetic bearing assembly 200 may a use a combination of different types of sensors to determine radial position and axial position.

The rotating shaft 104 may further include a bushing 324 coupled to the rotating shaft 104 through an interference fit, welding, or similar means of attachment. The bushing 324 may prevent the auxiliary bearing assembly 212 from damaging the rotating shaft 104 and provide proper clearance such that, in the event of a failure of the active radial magnetic bearing assembly 200 or the controller 114, no contact occurs between the rotor 308 and the stator 204.

Figure 4:
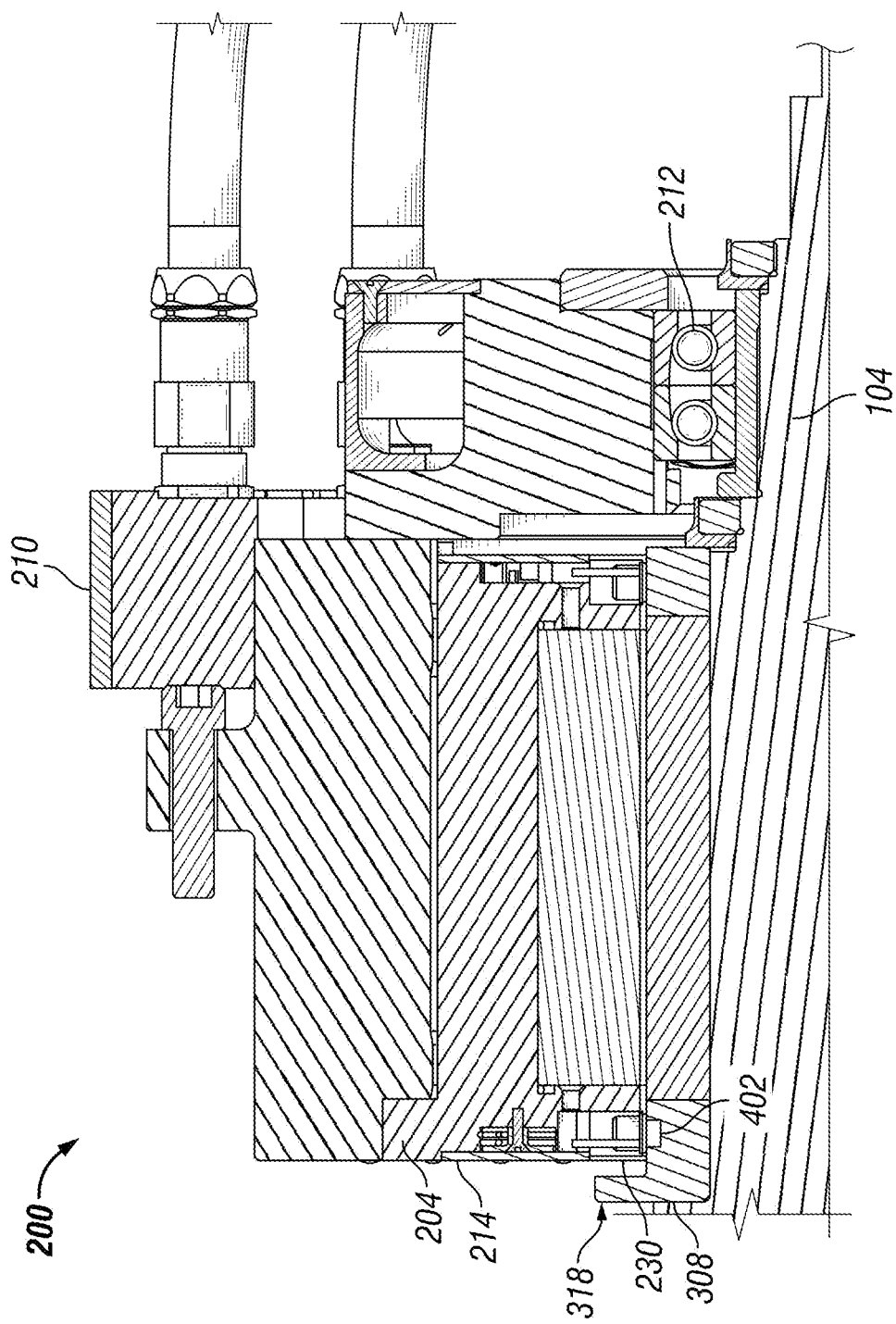
FIG. 4 illustrates a partial cross-sectional view of the active radial magnetic bearing assembly of FIG. 2 along line B-B with a rotor, according to one or more embodiments disclosed.

Referring now to FIG. 4 with continued reference to FIGS. 1, 2, and 3, FIG. 4 illustrates a partial cross-sectional view of the active radial magnetic bearing assembly 200 of FIG. 2 along line B-B, according to one or more embodiments. The active radial magnetic bearing assembly 200 may further include one or more electrical junction boxes 210 that house the connections between electrical power system or controller 114, and the sensors 226, 228, 230 or electromagnets 206. In some embodiments, there may be one or more electrical junction boxes 210 mounted to the housing 202, the auxiliary bearing assembly 212, or both. One electrical junction box 210 may be dedicated solely to controller 114 connections, while another electrical junction box 210 may be used solely for electrical power connections. In other embodiments, electrical junction boxes 210 may house both controller 114 and electrical power connections.

As with the radial and axial position sensors 226, 228, the phase angle or rotational speed sensor 230 may be an eddy current sensor as describe above. As illustrated in FIG. 4, the phase angle or rotational speed sensor 230 may be axially aligned with a target 402 on the rotor 308. In another embodiment, the phase angle or rotational speed sensor 230 may be aligned with a target 402 on the protrusion 318. In such embodiments, the phase angle or rotational speed sensor 230 may be coupled to or adjacent the exposed end wall 214 of the stator 204.

In at least one embodiment, the target 402 may be geometric feature, such as a notch cut into the rotor 308 or protrusion 318, which causes a momentary change in the opposing magnetic field resulting from the induced current. This change occurs once per revolution of the rotor 308 or rotating shaft 104, allowing the sensor 230 to determine rotational speed. Multiple, differentiable, momentary changes may also be used to determine shaft phase angle. In other embodiments, the target 402 may be a section of the rotor 308 that is inlaid with a different material or otherwise differentiated to create a momentary change in the opposing magnetic field. In some embodiments, the phase angle or rotational speed sensor 230 may also be used to determine the radial or axial position of the rotor 308 or rotating shaft 104.

As with the radial and axial position sensors 226, 228, the phase angle or rotational speed sensor 230 may also be a visual sensor, an infrared sensor, an ultrasonic sensor, or any other type of sensor capable of being paired with a controller 114 to determine phase angle or rotational speed. In these embodiments, the target 402 may be painted or provided with another type of indicia on the rotor 308 or protrusion 318, or the target 402 may be otherwise differentiated in a way that can be detected by the phase angle or rotational speed sensor 230.

Figure 5:
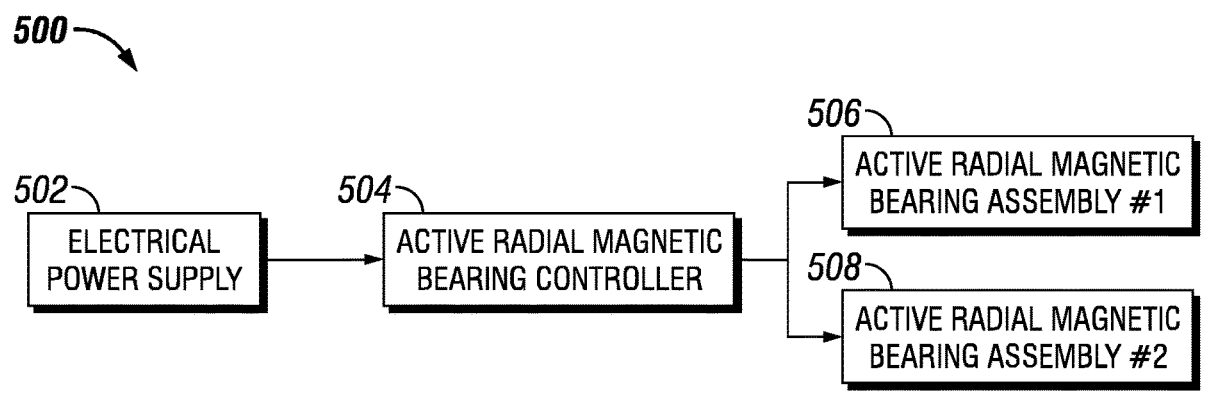
FIG. 5 illustrates a schematic of an exemplary active radial magnetic bearing system, according to one or more embodiments disclosed.

FIG. 5 illustrates a schematic of an exemplary active radial magnetic bearing system 500 that may include the active radial magnetic bearing assembly 200 described above. An electrical power supply 502 may be connected to the active radial magnetic bearing controller 504. The controller 504 may then be connected to the active radial magnetic bearing assemblies 506, 508 through a junction box or boxes on the active radial magnetic bearing assemblies 506, 508.

The controller 504 may provide electrical power to electromagnets in the active radial magnetic bearing assemblies 506, 508, allowing the electromagnets to generate magnetic forces that levitate or support the rotor or rotating shaft. The controller 504 may also use the information provided by the sensors on the active radial magnetic bearing assemblies 506, 508 to determine the radial position, axial position, phase angle, or rotational speed of the rotor or rotating shaft.

The controller 504 may then adjust the electrical power supplied to the electromagnets in the active radial magnetic bearing assemblies 506, 508 to levitate or support the rotor or rotating shaft in a desired position. The controller 504 may then use the sensors on the active radial magnetic bearing assemblies 506, 508 to determine the new radial position of the rotor or rotating shaft, and adjust the electrical power supplied to the electromagnets in the active radial magnetic bearing assemblies 506, 508 as necessary to maintain the desired position. The process of determining the radial position of the rotor or rotating shaft and adjusting the electrical power supplied to the electromagnets in the active radial magnetic bearing assemblies 506, 508 to maintain the desired position of the rotor or rotating shaft may continue as long as the active radial magnetic bearing system 500 is in operation.

The foregoing has outlined features of several embodiments so that those skilled in the art may better understand aspects of the present disclosure. Those skilled in the art should appreciate that they may readily use aspects of the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of aspects of the present disclosure, and that they may make various changes, substitutions and alterations herein without departing from the spirit and scope of aspects of the present disclosure.

We claim:

1. A rotating machine, comprising:
   an active radial magnetic bearing assembly, comprising:
      a housing comprising a center axis extending longitudinally therethrough and a housing inner surface,
      a stator coupled to the housing inner surface and comprising a stator inner surface extending axially between a first stator end wall and a second stator end wall,
      a rotor comprising a rotor outer surface, a portion of the rotor outer surface being a first target, and at least a portion of the rotor configured to rotate about the center axis within the stator, such that an annular gap is defined between the rotor outer surface and the stator inner surface,
      a second target coupled to or formed by the rotor, the second target axially spaced from the first target along the rotor, and
      a plurality of sensors coupled to the stator and adjacent the stator inner surface, the plurality of sensors comprising:
         a first sensor and a second sensor positioned to detect a radial position of the rotor via the first target, and
         a third sensor positioned to detect an axial position of the rotor via the second target.

2. The rotating machine of claim 1, wherein the second target comprises a protrusion extending radially outward from the rotor, the protrusion comprising a protrusion first surface axially spaced from and facing the first stator end wall.

3. The rotating machine of claim 2, wherein the third sensor is positioned to detect the axial position of the rotor via the protrusion first surface.

4. The rotating machine of claim 2, further comprising:
   a third target coupled to or defined by the protrusion; and
   a fourth sensor coupled to the stator and opposing the protrusion first surface, the fourth sensor positioned to detect at least one of a phase angle and a rotational speed of the rotor via the third target.

5. The rotating machine of claim 1, further comprising:
   a third target coupled to or defined by the rotor; and
   a fourth sensor coupled to the stator and disposed radially outward from the third target, the fourth sensor positioned to detect at least one of a phase angle and a rotational speed of the rotor via the third target.

6. The rotating machine of claim 1, wherein the first sensor and the second sensor are coupled to the stator inner surface and circumferentially spaced from one another about the rotor.

7. The rotating machine of claim 1, wherein the plurality of sensors comprises one or more eddy current sensors.

8. The rotating machine of claim 1, further comprising a plurality of electromagnets coupled to the stator and disposed circumferentially about the rotor, each electromagnet disposed within a respective recess defined by the stator inner surface and circumferentially spaced from the plurality of sensors.

9. An active radial magnetic bearing assembly, comprising:
   a housing comprising a center axis extending longitudinally therethrough and a housing inner surface;
   a stator coupled to the housing inner surface and comprising a stator inner surface extending axially between a first stator end wall and a second stator end wall;
   a rotor comprising a rotor outer surface, a portion of the rotor outer surface being a first target, and at least a portion of the rotor configured to rotate about the center axis within the stator, such that an annular gap is defined between the rotor outer surface and the stator inner surface;
   a second target coupled to or formed by the rotor, the second target axially spaced from the first target along the rotor; and
   a plurality of sensors coupled to the stator and adjacent the stator inner surface, the plurality of sensors comprising:
      a first sensor and a second sensor positioned to detect a radial position of the rotor via the first target, and
      a third sensor positioned to detect an axial position of the rotor via the second target.

10. The active radial magnetic bearing assembly of claim 9, wherein the second target comprises a protrusion extending radially outward from the rotor, the protrusion comprising a protrusion first surface axially spaced from and facing the first stator end wall.

11. The active radial magnetic bearing assembly of claim 10, further comprising:
    a third target coupled to or defined by the protrusion; and
    a fourth sensor coupled to the stator and opposing the protrusion first surface, the fourth sensor positioned to detect at least one of a phase angle and a rotational speed of the rotor via the third target.

12. The active radial magnetic bearing assembly of claim 9, further comprising:
    a third target coupled to or defined by the rotor; and
    a fourth sensor coupled to the stator and disposed radially outward from the third target, the fourth sensor positioned to detect at least one of a phase angle and a rotational speed of the rotor via the third target.

13. The active radial magnetic bearing assembly of claim 9, wherein the first sensor and the second sensor are coupled to the stator inner surface and circumferentially spaced from one another about the rotor.

14. The active radial magnetic bearing assembly of claim 9, wherein the plurality of sensors comprises one or more eddy current sensors.

15. A system for determining an axial position, a radial position, and at least one of a phase angle and a rotational speed of a rotary shaft, comprising:
    the rotary shaft;
    a plurality of active radial magnetic bearing assemblies configured to support the rotary shaft, each active radial magnetic bearing assembly comprising:
       a housing comprising a center axis extending longitudinally therethrough and a housing inner surface, a stator coupled to the housing inner surface and comprising a stator inner surface extending axially between a first stator end wall and a second stator end wall, a rotor coupled to the rotary shaft and comprising a rotor outer surface, a portion of the rotor outer surface being a first target, and at least a portion of the rotor configured to rotate about the center axis within the stator, such that an annular gap is defined between the rotor outer surface and the stator inner surface, a second target coupled to or formed by the rotor, the second target axially spaced from the first target along the rotor, and a plurality of sensors coupled to the stator and adjacent the stator inner surface, the plurality of sensors comprising:

a first sensor and a second sensor, each of the first sensor and the second sensor positioned to detect the radial position of the rotary shaft via the first target and transmit a radial position feedback signal, and a third sensor positioned to detect the axial position of the rotary shaft via the second target and transmit an axial position feedback signal, wherein a first active radial magnetic bearing assembly of the plurality of active radial magnetic bearing assemblies further comprises a fourth sensor positioned to detect the at least one of the phase angle and the rotational speed of the rotary shaft via a third target and transmit at least one of a phase angle feedback signal and a rotational speed feedback signal; and a control system configured to receive the radial position feedback signals, the axial position feedback signal, and the at least one of the phase angle feedback signal and the rotational speed feedback signal and determine the radial position, the axial position, and the at least one of the phase angle and the rotational speed of the rotary shaft.

16. The system of claim 15, wherein the third target is coupled to or defined by the rotor of the first active radial magnetic bearing assembly.

17. The system of claim 15, wherein the second target of each active radial magnetic bearing assembly comprises a protrusion extending radially outward from the rotor, the protrusion comprising a protrusion first surface axially spaced from and facing the first stator end wall.

18. The system of claim 17, wherein the third target is coupled to or defined by the protrusion of the first active radial magnetic bearing assembly.

19. The system of claim 15, wherein the first sensor and the second sensor of each active radial magnetic bearing assembly are coupled to the stator inner surface and circumferentially spaced from one another about the rotor.

20. The system of claim 15, wherein the plurality of sensors of each active radial magnetic bearing assembly comprises one or more eddy current sensors.

* * * * *